United States Patent

Danial

[19]

[11] Patent Number: 5,940,806
[45] Date of Patent: Aug. 17, 1999

[54] METHOD AND APPARATUS FOR RECEIVING, STORING AND PROVIDING DATA CORRESPONDING TO GEOMETRICALLY DESCRIBABLE RAW MATERIALS

[76] Inventor: Jeffrey Danial, 63 W. 38th St., New York, N.Y. 10018

[21] Appl. No.: 08/697,630

[22] Filed: Aug. 28, 1996

[51] Int. Cl.[6] .................................................. G06F 17/60
[52] U.S. Cl. .............................................. 705/26; 705/29
[58] Field of Search ............................. 705/1, 26, 27–29, 705/34, 37, 16, 20, 21

[56] References Cited

U.S. PATENT DOCUMENTS

| | | | |
|---|---|---|---|
| 4,734,858 | 3/1988 | Schiafly | 235/380 |
| 4,893,333 | 1/1990 | Baran et al. | 379/100.11 |
| 4,918,722 | 4/1990 | Duehren et al. | 374/100.11 |
| 4,992,940 | 2/1991 | Dworkin | 705/26 |
| 5,068,888 | 11/1991 | Scherk et al. | 379/100.11 |
| 5,136,634 | 8/1992 | Rae et al. | 379/100.11 |
| 5,196,943 | 3/1993 | Hersee et al. | 358/403 |
| 5,283,731 | 2/1994 | Lalonde et al. | 379/71 |
| 5,341,222 | 8/1994 | Newman et al. | 358/403 |
| 5,406,475 | 4/1995 | Kouchi et al. | 705/58 |
| 5,532,838 | 7/1996 | Barbari | 358/402 |
| 5,590,197 | 12/1996 | Chen et al. | 380/24 |
| 5,633,918 | 5/1997 | Mankovitz | 379/97 |

FOREIGN PATENT DOCUMENTS 406251253  2/1993  Japan.

OTHER PUBLICATIONS

News & Notes, "Videodics and Optical Disk", Jul.–Aug. 1985, pp. 224–247.

"Product Search System Launched for Architects and Interior Designers", Videodisc and Optical Disk, News and Notes, Jul.–Aug., 1985, pp. 244–247.

Primary Examiner—Frantzy Poinvil
Attorney, Agent, or Firm—Frishauf, Holtz, Goodman, Langer & Chick, P.C.

[57] ABSTRACT

Apparatus and method employing a programmable computer for providing a list of data items corresponding to geometrically describable materials based upon a profile specified by a user includes, storing data items in a data base. Each data item includes geometrically descriptive terms and trading parameters identifying characteristics of an item offered for sale by an advertiser. A profile is generated by a user which includes geometrically descriptive terms and trading parameters identifying characteristics of an item sought for purchase by the user. The profile identified by the user is compared to each data item stored in the data base and data items are identified which match the profile. The data item identified are provided to the user in accordance with the user's specific delivery instructions.

21 Claims, 17 Drawing Sheets

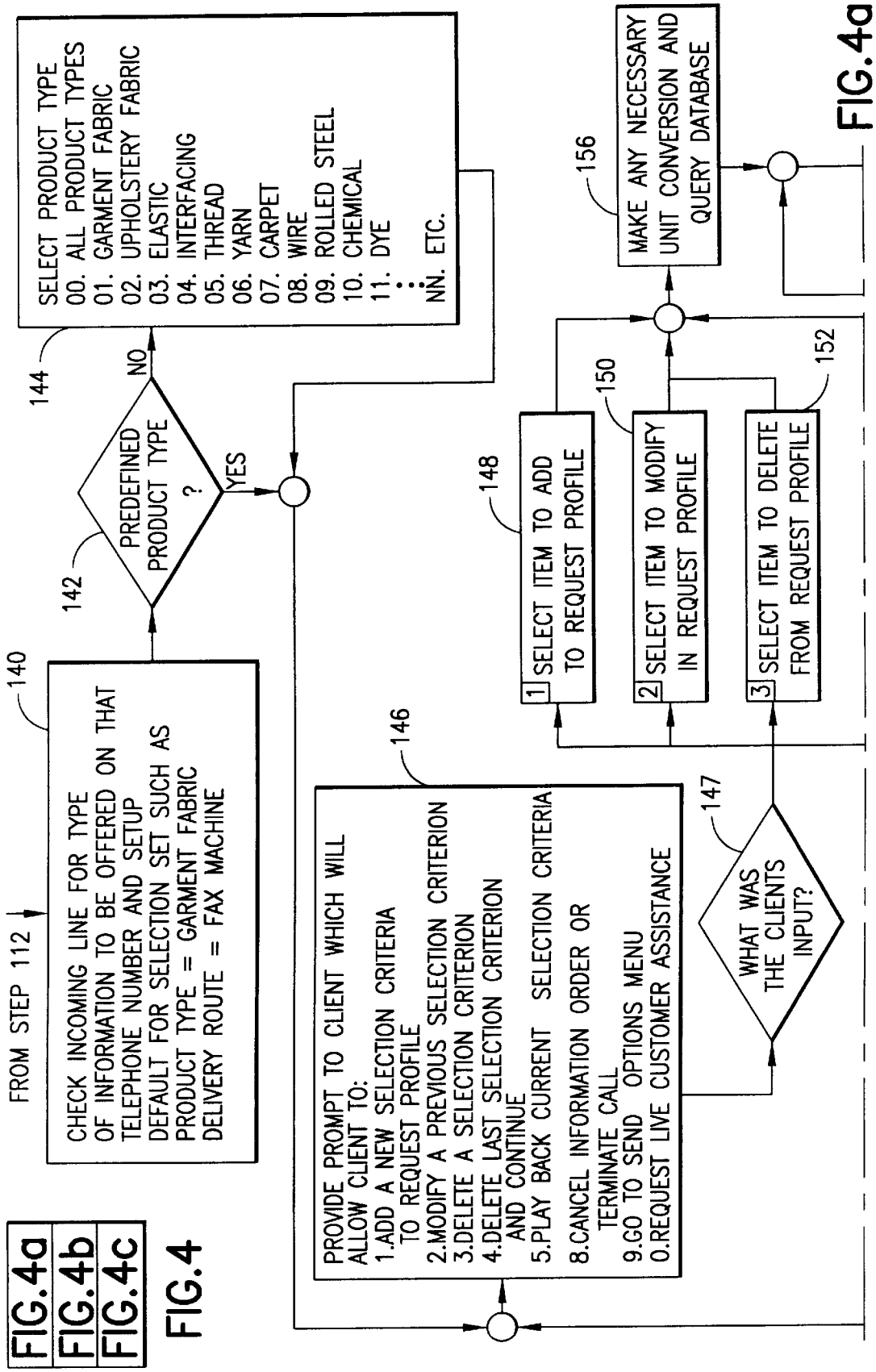

SET UP SYSTEM SO USER CAN PRESS THE STAR(*) KEY FOLLOWED BY A DIGIT TO PERFORM SPECIAL FUNCTIONS:

** IS USED IN PLACE OF A DECIMAL PLACE FOR NUMERICAL ENTRY.
*0 CUSTOMER SERVICE ASSISTANCE AND HELP MENU'S.
*1 CANCEL CURRENT SELECTION CRITERIA & GO BACK ONE MENU.
*2 SEND BY FAX THE LIST OF CURRENT SELECTIONS IMMEDIATELY.
*4 GREATER THAN (>) OPERATOR FOR CURRENT SELECTION CRITERION.
*5 LESS THAN (<) OPERATOR FOR CURRENT SELECTION CRITERION.
*6 OR OPERATOR FOR CURRENT CRITERION.

FROM THE FOLLOWING MENU PLEASE KEY IN YOUR CHOICE FOLLOWED BY THE POUND(#) KEY...
KEY
01. PRODUCT CATEGORY
02. FABRIC NAME
03. INTERFACING NAME
04. THREAD NAME
05. YARN NAME
06. ELASTIC NAME
07. WEIGHT PER UNIT
08. WIDTH (INCHES)
09. LENGTH PER ROLL
10. COUNTRY OF MANUFACTURE
11. STRETCH (LENGTH %-WIDTH %)
12. SHRINKAGE (%)
13. STRENGTH
14. HAND, FIRMNESS & TEXTURE
15. WEAVE
16. CONTENT (nn% RAYON + yy% COTTON, ETC...)
17. COLOR CATEGORY
18. BASE COLOR
19. PRINT DESCRIPTION
20. PROCESS
21. FOB LOCATION OF DELIVERY
22. YARDS ON HAND
23. MONTHLY AVAILABILITY
24. DELIVERY LEAD TIME
25. PRICE $/YARD

| FIG.7a-1 |
| FIG.7a-2 |
| FIG.7a-3 |
| FIG.7a-4 |

FIG.7a

METHOD AND APPARATUS FOR RECEIVING, STORING AND PROVIDING DATA CORRESPONDING TO GEOMETRICALLY DESCRIBABLE RAW MATERIALS

BACKGROUND OF THE INVENTION

1. Field of the Invention

The present invention relates to the selective input, access, and output of data items from a data base, and more particularly to a method and apparatus for receiving, storing, accessing and providing data items from a data base, wherein the data items correspond to geometrically describable characteristics and trading parameters of raw materials.

2. Description of the Prior Art

The manufacturers, distributors and users of raw materials sold by volume, weight, box, roll and spool, such as textiles and metals, are frequently inundated with large amounts of slow moving and outmoded inventories tying up both capital and warehouse storage space. Additionally, many manufacturers with stock inventory of raw materials go into or out of business every year, either looking for new suppliers or trying to liquidate stock. The information regarding the availability and description of these raw materials is at best incomplete. This makes it difficult to sell the raw materials to free capital and warehouse storage space, and to liquidate stock.

The initiation of contact between the buyer and seller of rolled and spooled goods (such as textiles and metals) traditionally occurs through either a personal contact, a referral, or a magazine advertisement. In most industries, there are several layers of middlemen who, for a "finders fee", provide profitable "source information" to introduce a seller having a particular good to a buyer who wishes to purchase the particular goods. The payment of the "finders fee" significantly reduces the overall amount of money realized as a result of a sale. It is evident that a more defined and ordered system of communication could vastly improve the contacts between the buyer and seller of the particular goods and enable a seller to realize a greater return.

There are numerous ways in which technology can be and has been implemented in order to better serve the needs of a particular industry. One example is the use of the Internet to provide information to buyers and sellers in the form of a classified advertisement. Another (e.g., fax on demand systems) is the use of the facsimile machine to transmit a list of suppliers' of goods in response to a telephone inquiry made by a person who has an interest in those goods. Examples of such systems can be found in U.S. Pat. No. 5,283,731 (LaLonde et al), U.S. Pat. No. 5,532,838 (Barbari), and U.S. Pat. No. 5,136,634 (Rae et al).

Fax-on-demand systems typically have the ability to provide information based on a general text search. The text search compares an input parameter with existing text stored in a generalized advertising data base. Other fax-on-demand systems typically enable a user to select a particular document or listing that the user would like sent via fax, or, alternatively, select a general category (e.g., canvas) in which the user has an interest. The user is then provided, via fax, all classified advertisements relating to the selected general category.

Prior art systems have, however, failed to offer the supplier and purchaser of geometrically describable (e.g., size, texture, weight, etc.) raw materials (e.g., textiles, metals, wire, chemical and dye) an easy way to store, access and retrieve information to make contact with one another.

It is therefore an object of the present invention to provide a method and apparatus for permitting a supplier of geometrically describable raw materials to remotely enter data items which the supplier wishes to sell, into a programmable computer based system, for access by a potential purchaser.

It is another object of the present invention to provide a method and apparatus for permitting a potential purchaser (information client) to remotely enter a request profile descriptive of a geometrically describable raw material, into a programmable computer based system to search a data base for a supplier.

It is yet another object of the present invention to provide a method and apparatus for selecting and providing data items stored in a programmable computer-based system in response to a potential purchaser's remotely entered request profile.

It is still another object of the present invention to provide a method for searching a data base on a request profile which is capable of correlating weight and measure units of the request profile and weight and measure units provided by a supplier.

It is a further object of the present invention to overcome inherent disadvantages of known programmable computer-based classified-ad type systems.

In accordance with one form of the present invention, the method employing a programmable computer for providing a list of data items corresponding to geometrically describable raw materials based upon a request profile specified by a purchaser includes storing in a data base, a plurality of data items including a first plurality of geometrically descriptive terms and trading parameters identifying characteristics of an item offered for sale by a supplier. The method further includes receiving a request profile from an information client, the request profile including a plurality of geometrically descriptive terms and trading parameters identifying characteristics of an item sought by the information client. Then, comparing the request profile having the second plurality of geometrically descriptive terms and trading parameters with each of the plurality of data items having the first plurality of geometrically descriptive terms and trading parameters. Thereafter, the method includes identifying each of the plurality of data items having the first plurality of geometrically descriptive terms and trading parameters which match the second plurality of geometrically descriptive terms and trading parameters of the request profile and providing each of the plurality of data items identified through the information client.

In accordance with another form of the present invention, apparatus for providing a list of data items corresponding to geometrically describable raw materials based upon a request profile specified by an information client includes means for storing in a data base, a plurality of data items including a first plurality of geometrically descriptive terms and trading parameters identifying characteristics of an item offered for sale by a supplier. The apparatus also includes means for receiving a request profile from an information client, the request profile including a second plurality of geometrically descriptive terms and trading parameters identifying characteristics of an item sought by the information client and means for comparing the request profile having the second plurality of geometrically descriptive terms and trading parameters with each of the plurality of data items having the first plurality of geometrically descriptive terms and trading parameters. The apparatus further includes means for identifying each of the plurality of data items having the first plurality of data geometrically descriptive terms and trading parameters which match the second plurality of geometrically descriptive terms and trading parameters of the request profile. Finally, means for providing each of the plurality of data items through the client is provided.

A preferred form of the method and apparatus for interactively receiving, storing and providing data corresponding to geometrically describable raw materials, as well as other embodiments, objects, features and advantages of this invention, will be apparent from the following detailed description of illustrative embodiments thereof, which is to be read in connection with the accompanying drawings.

DETAILED DESCRIPTION OF PREFERRED EMBODIMENT

Figure 1:
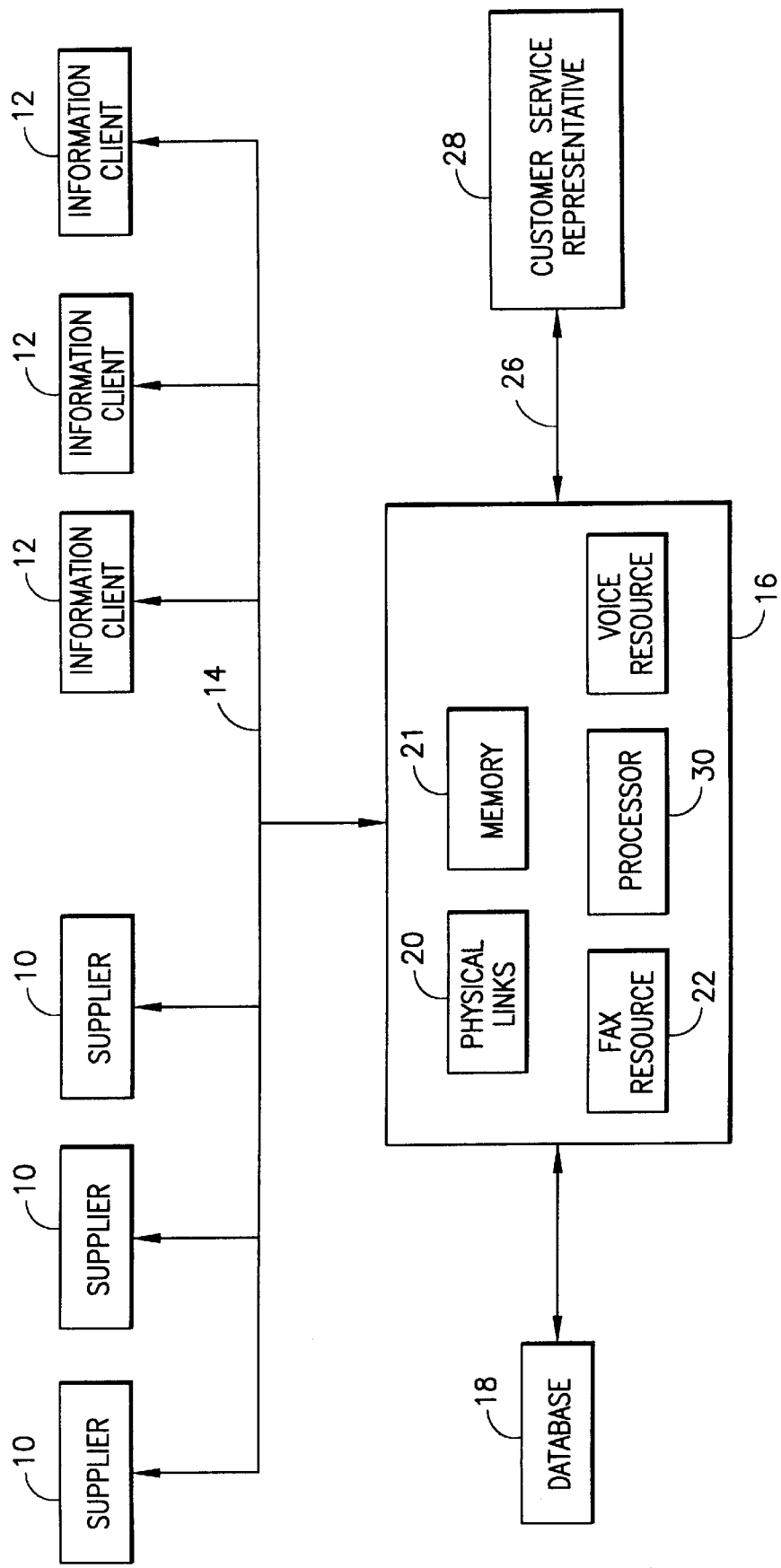
FIG. 1 is a functional block diagram of the apparatus of the present invention.

Referring now to FIG. 1 of the drawings, the overall configuration of a system 1 in conjunction with one preferred embodiment of the invention is shown. More specifically, FIG. 1 shows a plurality of suppliers 10 and a plurality of information clients 12 coupled to a communication link 14. Both the plurality of suppliers and information clients are coupled to the communication link via a respective telephone system, computer system and the like. The system 1 also includes a programmable computer 16 operatively coupled to communication link 14. The programmable computer preferably is linked to a data base 18 for storage of information as will be described in more detail below. The programmable computer may be a minicomputer, personal computer or other suitable computer. The communication link 14 is preferably a portion of a public switched telephone network (PSTN) so that the telephone system or computer system of the supplier and information client may call the programmable computer. It is also foreseen that the communication link may be made, inter alia, via the internet network, satellite network, cellular telephone network, and automatic teller machine network.

Operatively coupled to the communication link 14 and preferably residing in the programmable computer are a plurality of physical links 20. The physical links 20 function as the means through which the supplier 10 and information client 12 transmit information to, and receive information from, the programmable computer 16 via the aforementioned communication links 14. In the preferred embodiment, the physical links include but are not limited to hardware connections which enable communication via the telephone network, internet, satellite network, cellular telephone network, automatic teller machine network (ATM), ethernet, 10 Base T and other communication networks. The system also preferably includes memory 21 for storing and accessing communication protocols and application programming interfaces (API) which enable the supplier or information client to communicate with the system computer or service representatives via the physical links. The communication protocols and API include, but are not limited to, Modem protocols, POTS, ISDN, T1, E1, SS7, TCP/IP, Netbeui, IPX, X. 25 and SCSA. As known in the art, the communications protocols and API's send and receive tone, voice, data, fax and video through corresponding physical links 20 between the supplier 10 and information client 12, and the programmable computer.

The system 1 may also include a fax resource 22 (fax board) which, as known in the art, is utilized to convert information generated in the system computer to a facsimile compatible signal for transmission over a communication line. The fax resource is also utilized to convert a fax input signal to a computer compatible signal (computer data). The system also includes a voice resource 24 (voice board) as known in the art which converts text to speech (e.g. voice synthesis) and converts speech to text so that a voice input may communicate with the programmable computer.

The system may also include a link 26 to a customer service representative 28 so that the supplier or information client may access the system without directly communicating with the programmable computer 16 so that the supplier or client can speak with a customer service representative when desired.

Each of the fax resource 22, voice resource 24, physical links 20 and communication protocols communicate with one another via a computer bus (not shown). The fax resource, voice resource and communication protocols are controlled by the programmable computer through a series of commands executed by the programmable computers processor 30 wherein the method of the present invention is executed.

Figure 2:
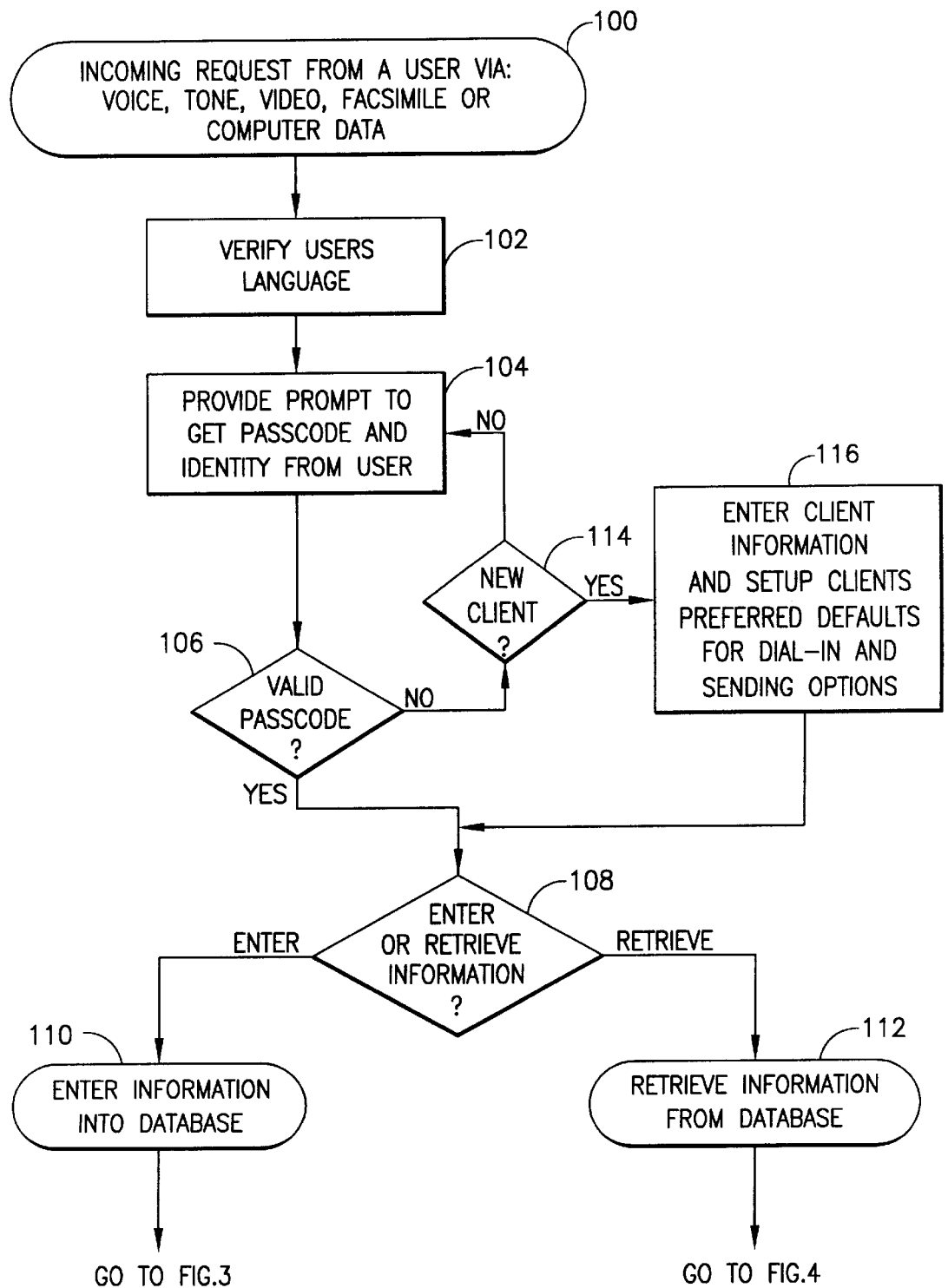
FIG. 2 is a flow chart showing the method of receiving and providing data items for storage in a data base, and selecting specific data items stored in the data base, corresponding to a request profile.

Referring now to FIG. 2 of the drawings, a flow chart of the steps performed to provide entry by a supplier and access or retrieval by an information client of data items corresponding to geometrically descriptive raw materials is shown. In a preferred embodiment of the invention, the method is employed for enabling a seller of a specific textile raw material and a potential purchaser of the textile raw material (e.g., elastic, garment fabrics, thread, upholstery fabric, carpet, linoleum, and yarn) to know of each others respective desire to sell and purchase. This is done by either advising a seller (via a listing stored in a data base) of a buyer's interest in purchasing a specific textile raw material or advising a buyer (via a listing stored in a data base) that a seller has a specific textile raw material for sale. The system may also be utilized by persons desirous of knowing the availability or demand of a specific textile raw material in order to access the current market conditions. Textile raw materials include textiles which either include a design or do not include a design.

In a preferred embodiment of the invention, the system is activated by an incoming request from a user (either supplier or information client) (Step 100). The request can be made, inter alia, by a voice request to a customer service representative or computer via a voice resource, by a facsimile request to a customer service representative or computer via a fax resource, by computer to computer communication through the internet or a modem connection or other physical link, by telephone or computer tone response or by video data (e.g., interactive television). Once a request has been received by the system (e.g., programmable computer), the programmable computer preferably determines the language of the request (Step 102). For communications made directly to the computer, this is achieved by utilizing a voice and character recognition device as known in the art. Alternatively, the user may be provided with a prompt to specify the language in which he would like to communicate. Once the user's language is determined, a prompt is provided to the user requesting that the user's identity and passcode be provided (Step 104). For example, if a voice telephone request was being made by the user, the computer would, based upon the language determined in Step 102, generate a voice message in the user's language requesting that the user's identity and passcode be provided. It is foreseen that the passcode may be provided, inter alia, by the client verbally or, using a telephone handset or computer keyboard, by tone signals.

Based upon the passcode provided by the user in Step 104, the system determines whether the passcode is valid (Step 106). If the passcode is invalid or if the user is unable to provide a valid passcode (No in Step 106), then a determination is made by the system as to whether the party is a new client (Step 114). Specifically, the computer memory which contains a listing of the identity of all current clients is reviewed. If the user is not a new client (No in Step 114), then the user is requested to provide the passcode again (Step 104). This loop is repeated until a valid passcode is provided. In the preferred embodiment, the user has three (3) opportunities to enter a valid passcode. If a valid passcode is not entered after three attempts, the communication is preferably terminated. The user's telephone number may then be recorded. If the user is a new client (Yes in Step 114), then prompts are provided by the programmable computer to the user for obtaining new client information from the user such as billing/credit information, addresses and telephone numbers and preferred delivery instructions as will be described below (Step 116).

If the user is able to provide a valid passcode (Yes in Step 106), then a prompt is provided by the programmable computer to the user (Step 108) inquiring as to whether the user would like to enter information to be stored in the system data base (i.e., the user is a supplier), or whether the user would like to retrieve information from the system (i.e., the user is an information client wishing to access information stored in the data base) based upon a request profile (described in more detail below).

Figure 3:
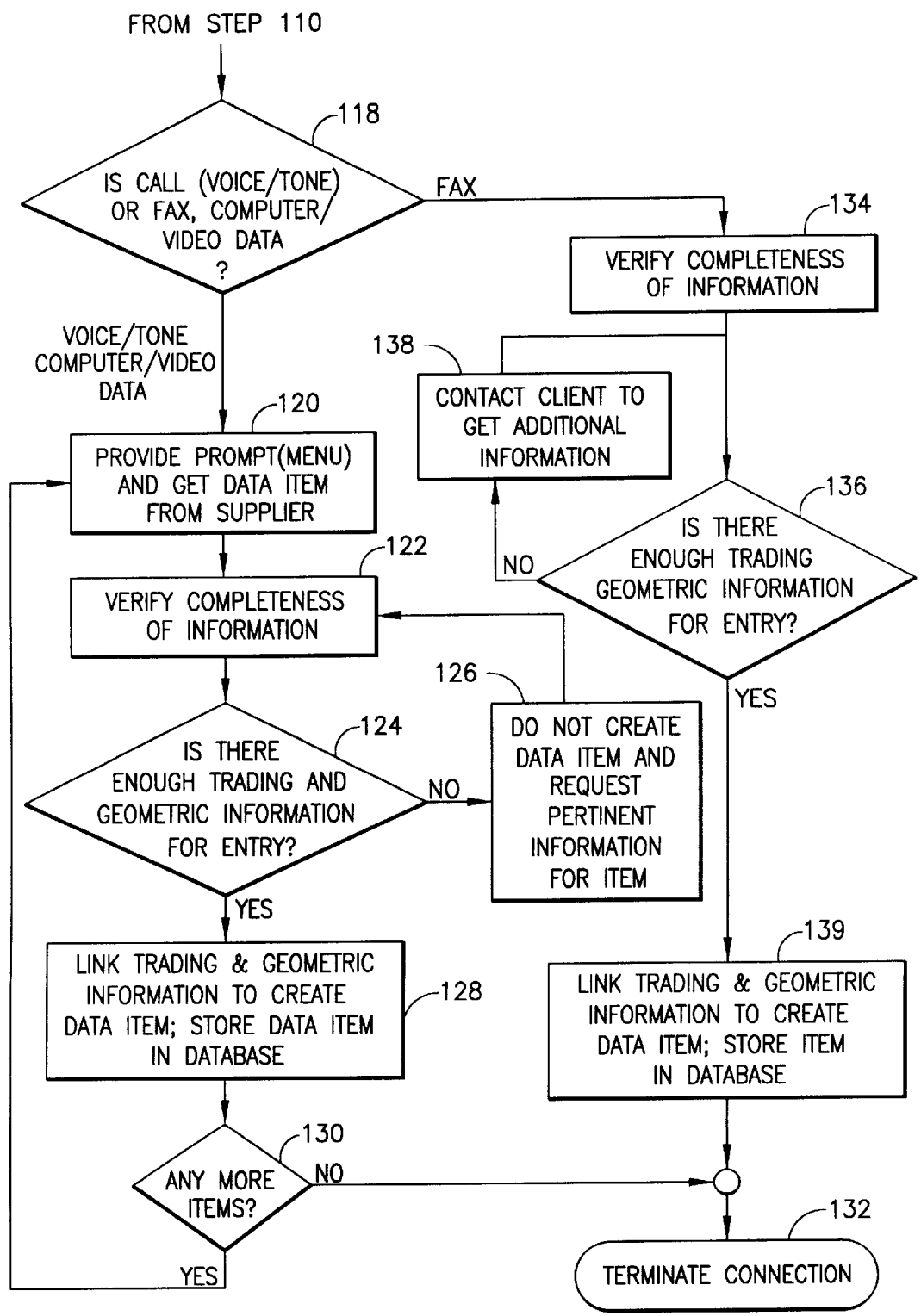
FIG. 3 is a flow chart showing the method of the present invention after the enter information step (Step 110) of FIG. 2.
Figure 4B:
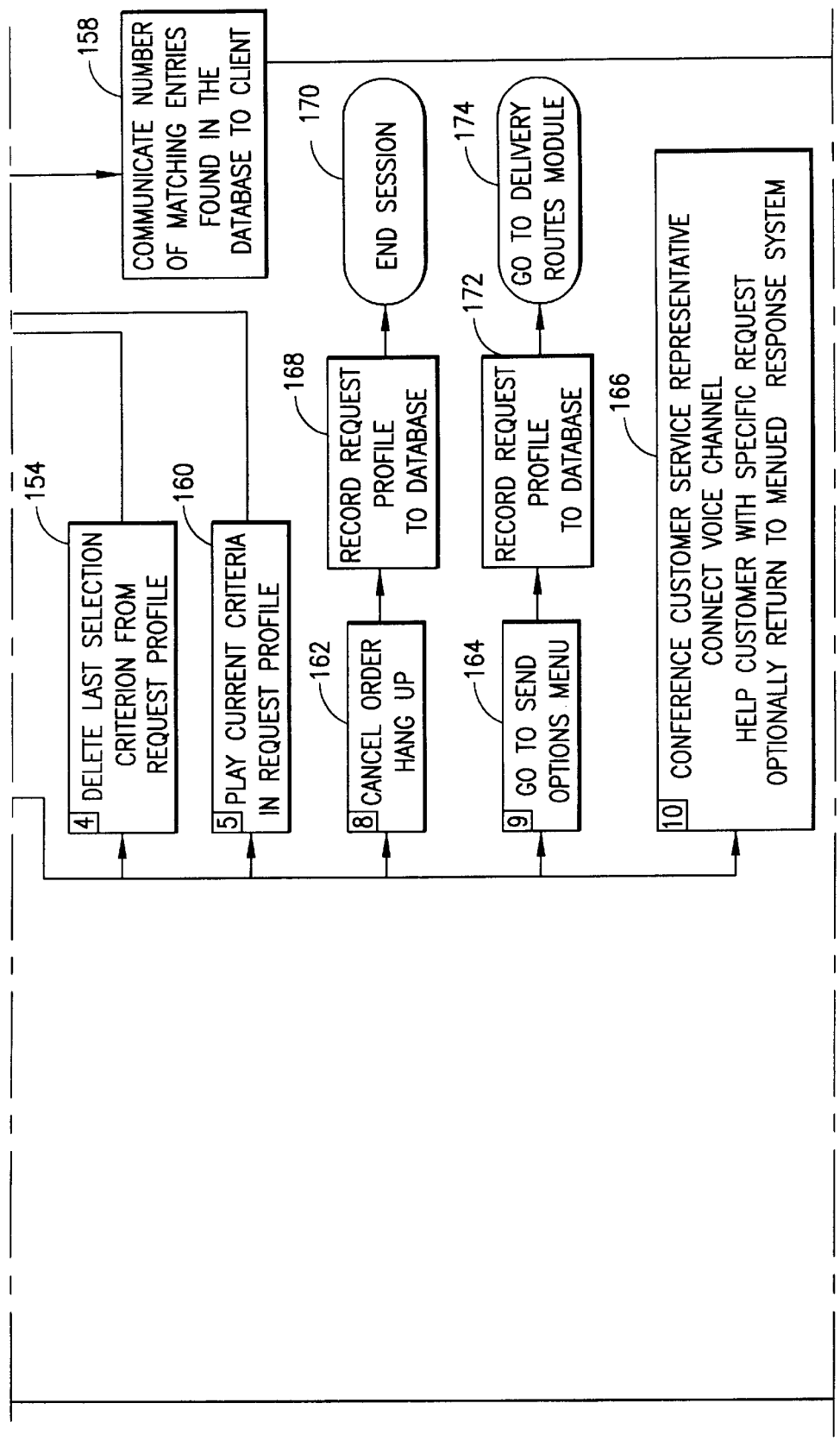
FIG. 4 is a flow chart showing the method of the present invention after the retrieve information step (Step 112) of FIG. 2.
Figure 4C:
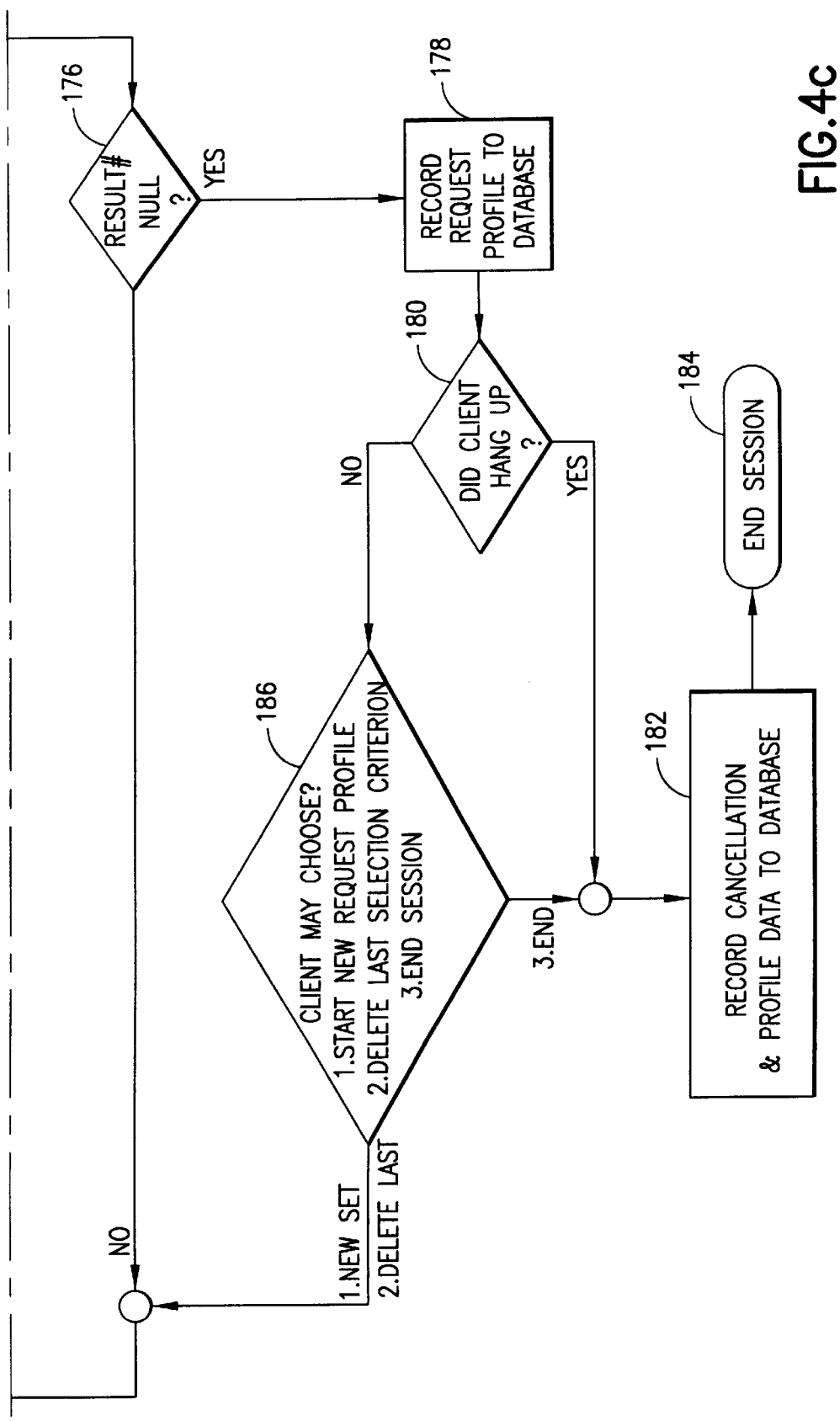
Figures 2, 7A:
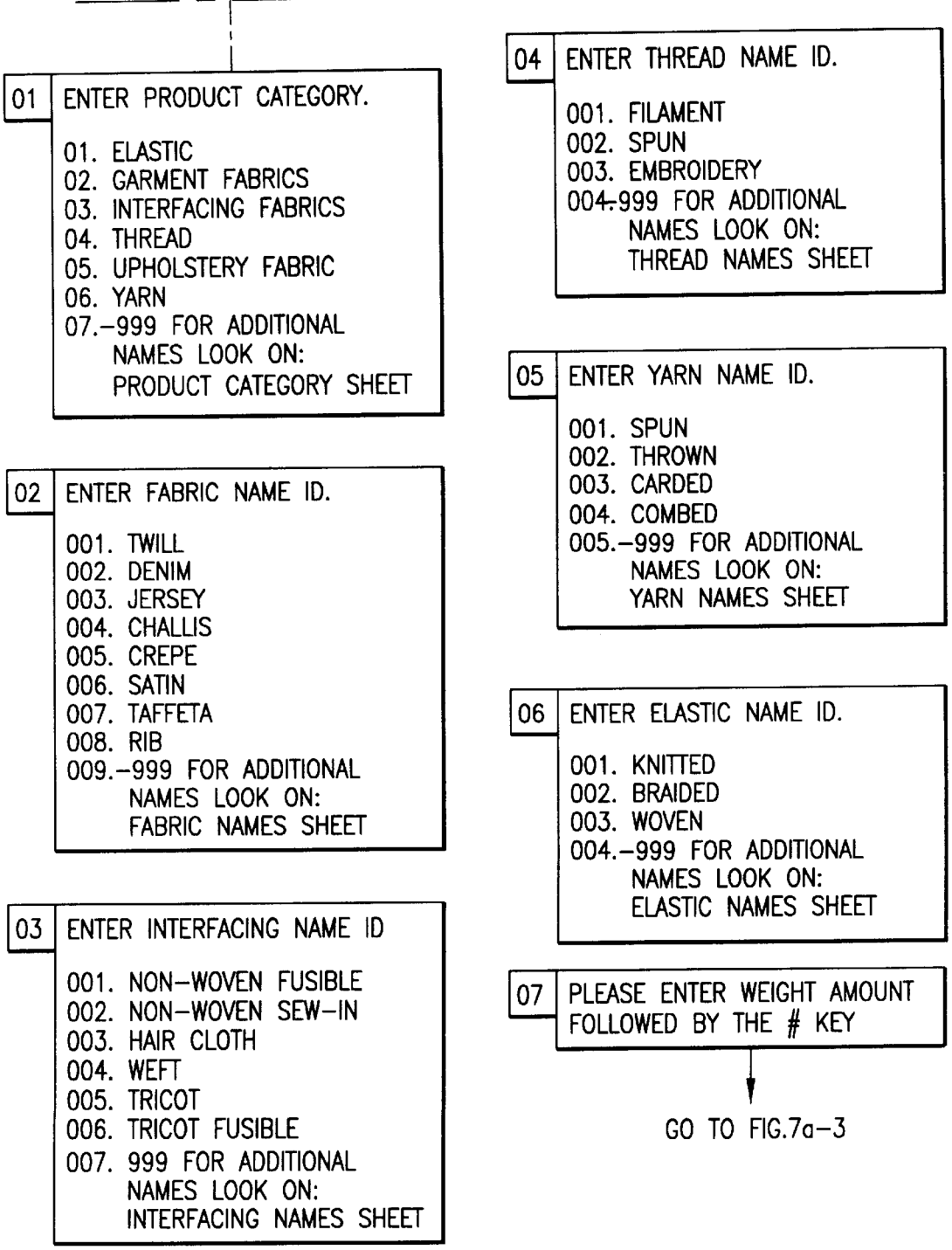
FIG. 7A is a chart showing an example of the prompts (menu) provided by the programmable computer to assist the user in providing information regarding the geometrically descriptive raw material to the system.
Figures 3, 7A:
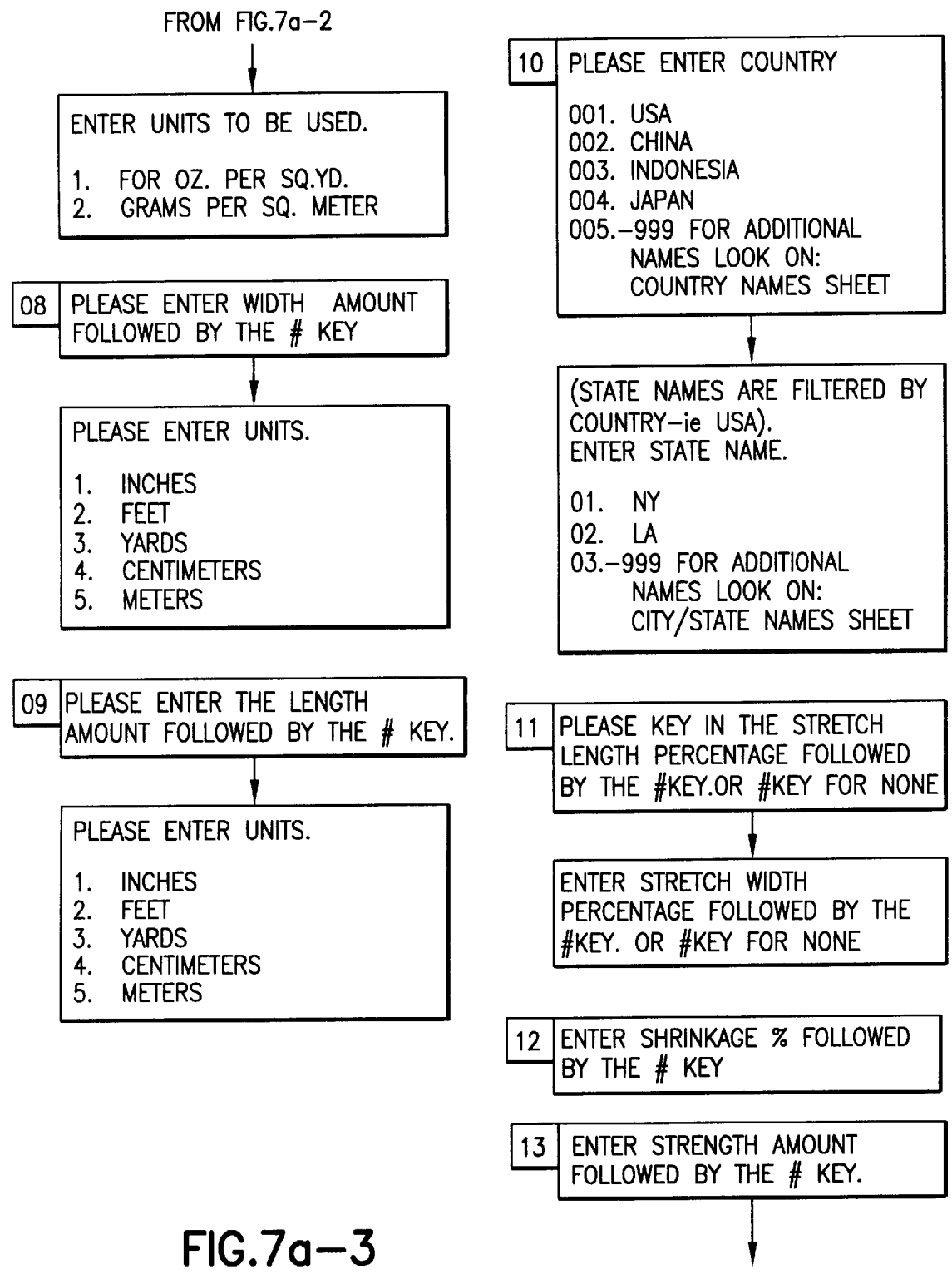

Referring now to FIG. 3, a flow diagram is shown which is a continuation of the user's decision to enter information into the data base (Step 110) of FIG. 2. When the user (hereinafter referred to as supplier) specifies that information (a data item) is to be provided for storage in the system data base, (ENTER in Step 108), a determination is made as to whether the supplier is communicating with the system via voice, tone, fax, computer or video data, (Step 118). If the supplier is communicating by either voice, tone, computer or video data (e.g., interactive television, the data base is initialized and information corresponding to the data item is entered in the computer data base. In the preferred embodiment, the information is provided by the supplier in response to prompts provided by the system. An example of the type of prompts provided by the system and the information the supplier may enter for textile raw materials is shown in FIG. 7 as inquiries 01–25. In response to each prompt, the supplier may respond by entering a selection provided in the prompt (menu). A different menu is provided for raw materials other than textiles and the system would be specifically configured to be responsive to the supplier's entries. As shown in FIG. 7a, if the user desires to speak to a customer service representative instead of the programmable computer, he may press the "*" and "0" buttons at anytime in order to exit the automatic data entry menu.

The system is preferably designed so that the supplier need not provide a response to every prompt. Preferably, the supplier responds only to those prompts which the supplier desires to have included in the data item stored in the data base. In the preferred embodiment of the invention, the system is designed to receive and store data items (descriptive of goods the supplier is desirous of selling), that are capable of being geometrically described. Examples of geometrically descriptive terms for use in connection with the present invention include, inter alia, roll, spool, box, volume, stretch, shrinkage, weight, length, width and type of print. The data item may also include, inter alia, trading parameters such as the amount of stock of the material, the availability, delivery period, color and price/unit.

Once the information for the data item has been provided to the system by the supplier (Step 120), the system verifies the completeness of the information provided (122). For example, the system will determine whether units of measure have been entered with all numerical inputs. Thereafter, the system looks to see if a sufficient amount of information is provided to create a data item entry in the data base (Step 124). Specifically, the system will determine whether a sufficient amount of geometrically descriptive terms and trading parameters have been provided by the supplier. For example, in the preferred embodiment, if the supplier has not provided at least four (4) geometrically descriptive terms and trading parameters, then a data item will not be created in the system data base. A minimum amount of information is preferably required in Step 124 in order to provide information clients (i.e., potential purchasers) with an accurate (i.e., partially complete) description of the raw material offered for sale.

As a result of a No decision in Step 124, the system will request that additional information (i.e., geometrically descriptive terms and trading parameters) be provided by the client (Step 126). This is accomplished by returning to a modified prompt menu for entry of information. If, in response, a sufficient amount of information is subsequently provided by the client to create a data item (e.g., at least four geometrically descriptive terms and trading parameters have been input), then the geometrically descriptive terms and trading parameters provided by the client are linked together to form a data item (i.e., data record). The data item is then entered and stored in the system data base (Step 128). Thereafter, an inquiry is made as to whether the supplier would like to create an additional data item (i.e., a second listing or classified advertisement) in the data base (Step 130). If an additional data item is to be entered into the data base (Yes in Step 130), then the method returns to Step 120 wherein the user is prompted to provide geometrically descriptive terms and trading parameters for a second data item. If the supplier does not wish to have an additional data item entered into the system data base, (No in Step 130), then the system terminates the call (Step 132) and awaits a communication from another user (either supplier or information client).

If the request from the supplier is made by facsimile (preferably on a standard request form paralleling the prompts provided by the computer) (Fax in Step 118), then a determination is made as to whether the information provided by the supplier is complete and sufficient for data item entry (Steps 134, 136). If the supplier has not provided complete or sufficient information to create a data item, (i.e., geometrically descriptive terms and trading parameters for the data item to be stored) (No in Step 136), then a notice indicating the deficiency is sent via facsimile to the supplier (Step 138). The notice preferably includes a form to be completed (filled in) by the supplier and returned to the system. Alternatively, the supplier may be contacted by voice transmission, or computer if the supplier has the capability. Once the information is received from the supplier, a determination is again made as to whether the additional information is sufficient to create a data item (Steps 134, 136) similar to Steps 122 and 124 previously described.

If the system determines that the information provided by the supplier is complete and sufficient to create a data item (e.g., at least four geometrically descriptive terms and trading parameters) (Yes in Step 136), then each of the geometrically descriptive terms and trading parameters provided by the supplier are linked together and entered into the data base as a new data item (Step 139). If the supplier has not provided the geometrically descriptive items and trading parameters in the standard units of the system, then the supplier's terms and parameters are normalized (i.e., converted to units standard for the system). Thereafter, both the supplier entered terms and parameters, and the normalized terms and parameters are stored in the data base. Once the data item is stored in the system data base, the system will await a call from another user (either a supplier or information client) (Step 132).

Figures 4, 7A:
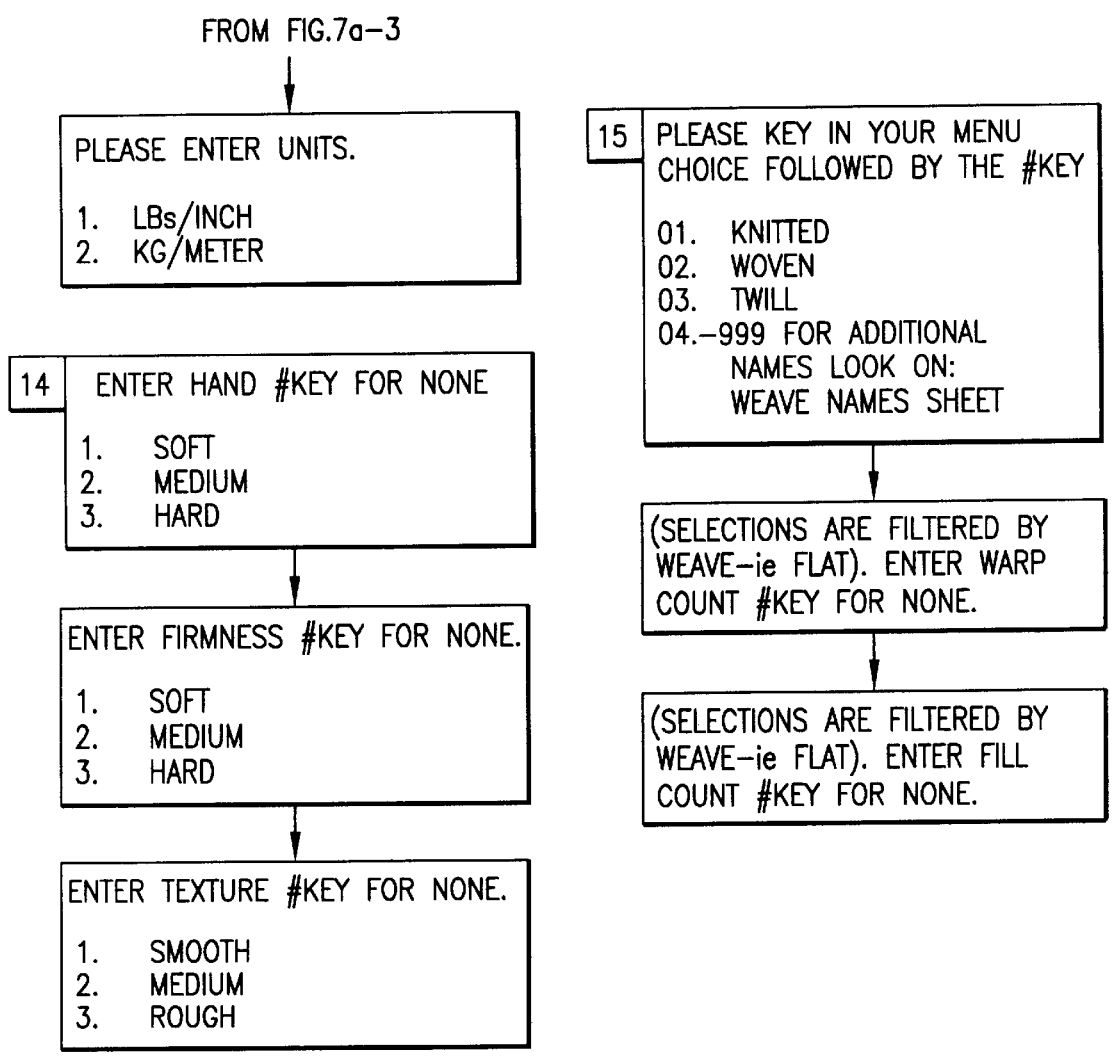
Figures 1, 7B:
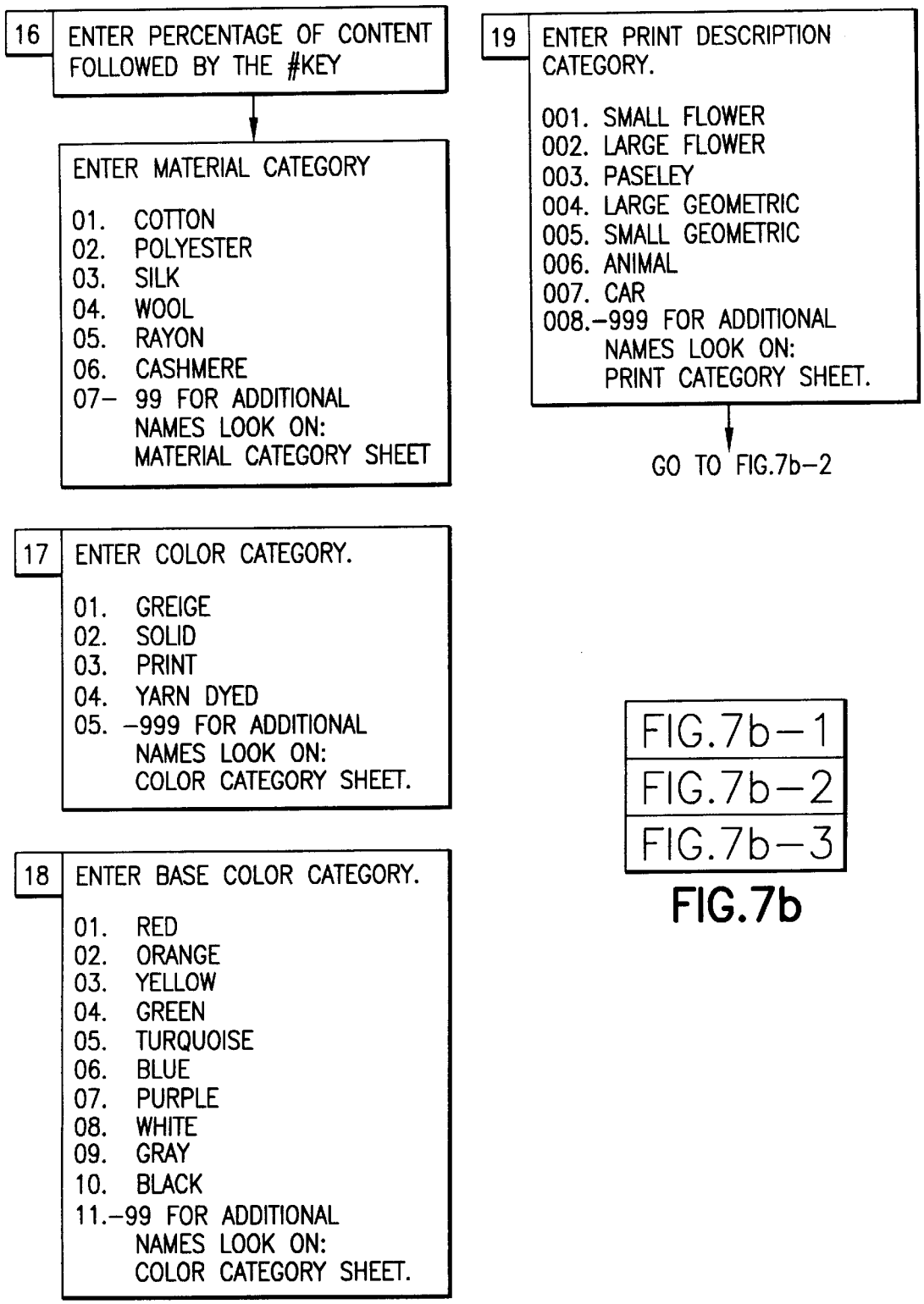
FIG. 7B is a continuation of the chart shown in FIG. 7A.
Figures 2, 7B:
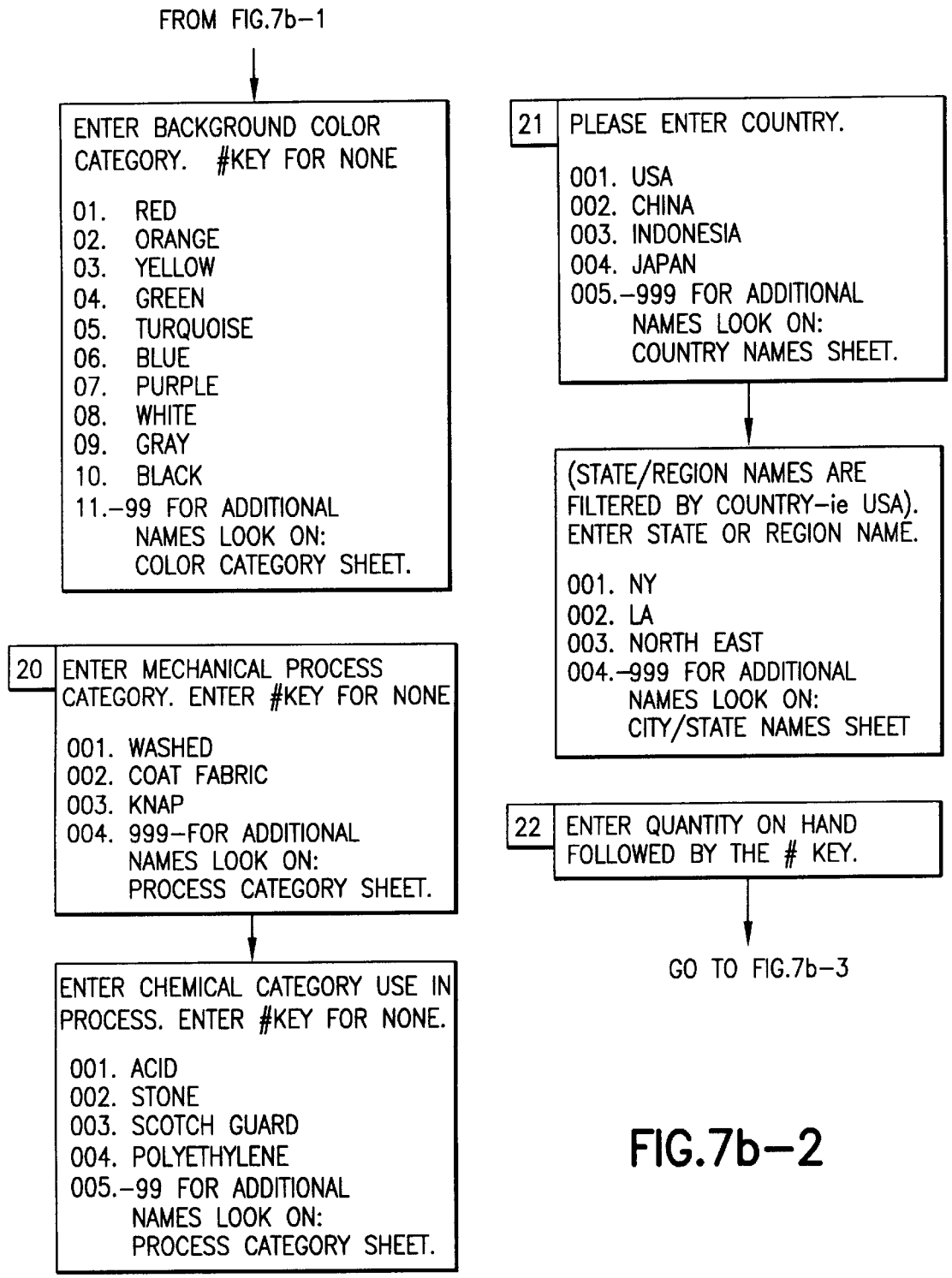
Figures 3, 7B:
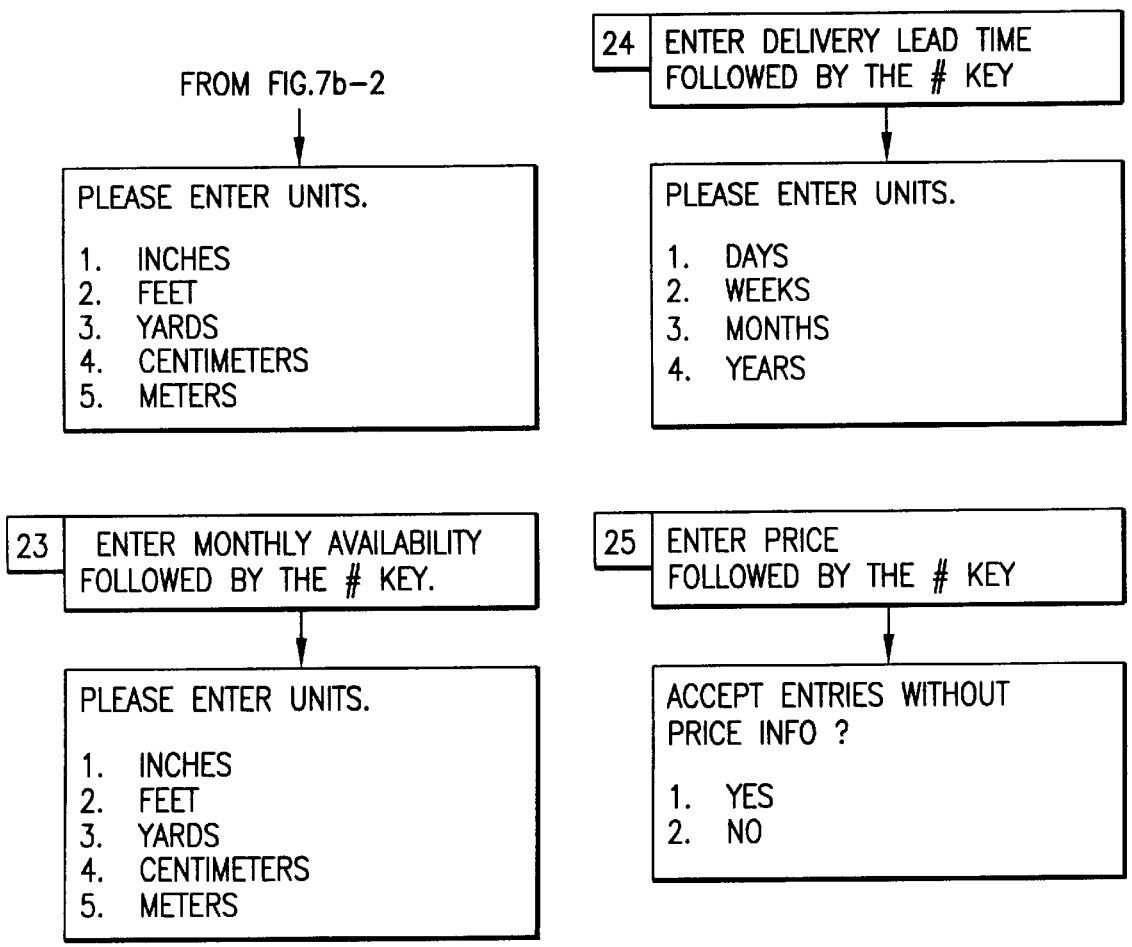

Referring now to FIG. 4, a flow chart of the steps performed by the system for retrieval of data items stored in the data base which are coincident with a request profile containing geometrically descriptive terms and trading parameters selected by the user (hereinafter information client) is shown. FIG. 4 is a continuation of the method from Step 112 of FIG. 2.

Once the system determines that the information client wishes to retrieve data items from the system data base, (RETRIEVE in Step 108), the system determines which of a plurality of system telephone lines the client's request is being provided (which telephone number did the client call), and the type of call (voice, fax, computer). In this way, the system will know how to respond to the information client (i.e., via fax, computer, etc.) and will be able to provide specific prompts with regard to a specific product as described below.

In the preferred embodiment of the invention, the system is designed to have a general telephone line and a plurality of specific telephone lines directed to specific types of products (e.g., one line for garment fabrics, one line for upholstery fabric, one line for elastic, one line for interfacing, one line for thread, one line for yarn, one line for carpet, one line for wire, one line for rolled steel, one line for chemical or one line for dye) (Step 140). If the telephone call is not provided on a predetermined product line (No in Step 142), then a prompt is provided to the information client to allow selection of a specific type of product (Step 144). This selection may be accomplished via a tone input, voice input or the like as known in the art.

If the call is provided on a predetermined product line (a particular telephone number is directed to a specific product) (Yes in Step 142), then a prompt (e.g., computer generated) is provided to the information client to determine what type of action the client requires (Step 146). In a preferred embodiment of the invention, the computer generated prompt enables the client to initiate a specific action by actuating, for example, the touch tone buttons on a telephone handset or specific keys on a computer keyboard. The computer generated prompt (Step 146), for example, enables a client to add a new geometrically descriptive term or trading parameter (selection criterion) to a current request profile (#1 on touch tone handset), modify a previously entered and stored request profile (#2 on touch tone handset), delete a geometrically descriptive term or trading parameter (selection criterion) from a current request profile (#3 on touch tone handset), delete the last geometrically descriptive term or trading parameter of the request profile and continue with creation of the request profile (#4 on touch tone handset), playback the current geometrically descriptive terms and trading parameters of the current request profile (#5 on touch tone handset), cancel the current request profile and exit the system (#8 on touch tone handset), go to an options menu (#9 on touch tone handset), or be connected to a customer service representative (#0 on touch tone handset).

Based upon the selection made by the client in Step 146, the system determines the selection (Step 147) and a specific action occurs within the system. In the preferred embodiment of the invention, if #1 on the telephone handset is actuated by the client, the system will recognize that the client wishes to add a geometrically descriptive term or trading parameter to the current user profile (Step 148). If the button corresponding to #2 on the telephone handset (Step 150) is activated, the system will understand that the client wishes to modify a previously entered geometrically descriptive term and trading parameter. For example, if the client initially indicated that he would like to include the percent of shrinkage characteristic of the fabric and a numerical percent that he entered was incorrect (e.g., 50% was imputed instead of 5%), then the client can return to the selection menu to modify his numerical input to correct the request profile.

In the preferred embodiment, if #3 on the touch tone handset is actuated by the information client, the system will recognize that the client would like to delete a prior selected geometrically descriptive term or trading parameter from the request profile. For example, if the client initially believes that the percent of stretch of the raw material (fabric) was important, and upon reconsideration it is decided that the percent of stretch is not important, by activating the button corresponding to the #3 on the handset, the client is provided an opportunity to delete a geometrically descriptive term or trading parameter (selection criterion) from the request profile. The selection of the #4 on the touch tone handset in response to the computer generated prompt enables the client to delete the last geometrically descriptive term or trading parameter from the current request profile (Step 154).

Upon selection of one of options "1–4" in response to Step 146, the system will note the units (e.g., pounds, inches, price per yard) entered by the information client in creating the request profile. The system will then determine whether the units provided for the geometrically descriptive term and trading parameters entered by the client are the standard units used for the data items stored in the data base (Step 156). If the units utilized in the request profile are the standard units used by the system, then a search is made of the data base for data items which match the request profile (Step 156). Otherwise, if the units entered by the information client do not coincide with those of the data base, the geometrically descriptive terms (and their units) are converted to the units standard (normalized units) for each geometrically descriptive term and trading parameter of the system. For example, if the supplier's data items are listed in metric units and the client enters English units in the request profile, the method will correlate the units of the data items to the units of the request profile. It is also foreseen that a supplier may provide ounces/sq. yard as a geometric descriptive term and the client enters pounds/roll in his request profile, the system will correlate the units of the data item with the units of the request profile.

If the system is unable to recognize the units entered by the information client, a prompt may be provided by the programmable computer requesting identification of the selected units. The conversion of the geometrically descriptive terms and trading parameters may occur, as known in the art, by reference to a look up table stored in the computer memory.

Once the data base has been searched for data items which coincide with the request profile (Step 156), the number of data items which match the request profile (i.e., the number of hits) are transmitted to the client (Step 158). If a telephone handset or video is employed by the client to communicate with the system, then voice synthesis is utilized by the system to communicate the number of "hits".

If upon receiving the computer generated prompts in Step 146 the client selects the fifth option (pushes the touch tone button corresponding to #5), the current profile including the designated geometrically descriptive terms and trading parameters are played (i.e., summarized) for the information client (Step 160). If a search of the data base was previously conducted for that request profile, the number of data items found in the data base which match the request profile is also provided to the client (Step 158).

The last three options (#8, #9 and #0) of Step 146 enable the client to cancel the order (request profile) and terminate the call (Step 162), go to the send options menu (Step 164) or connect to a customer service representative (Step 166), respectively. If the cancel order terminate call selection (Step 162) is selected by the client, the request profile is stored in the data base memory (Step 168) for possible future use or reference by the information client during a future call. The session is then terminated (Step 170). However, if the information client selects the "go to send options menu" (i.e., #9) (Step 164), the system will record the request profile in the data base (Step 172) and the system provides delivery options (i.e., a delivery options menu) (Step 174) for the client to receive the data items as shown in FIG. 5 and described in detail below.

Once the number of matching entries (i.e,. hits) is provided to the information client, a determination is made as to whether no (zero) data items match the request profile (Step 176). If there were no matches found in the data base for the request profile (Yes in Step 176), then the request profile is recorded in the data base (Step 178). Thereafter, a determination is made as to whether the client terminated the call (e.g., did the client hang up) (Step 180). If it is determined that the client did terminate the call (Yes in Step 180), then the system records the occurrence of the termination (Step 182). Thereafter, the system officially ends the session for the information client (Step 184) and the system will await a call from another user (supplier or information client).

If the information client did not hang up after being notified that no data items were located which match the request profile (No in Step 180), then the computer provides a menu wherein the client may choose to: 1. create a new request profile; 2. edit the preceding request profile; or 3. end the session. If the client elects to end the session, the method will continue with steps 182 and 184 wherein the client cancellation is recorded in the data base and the system will await a call from another user. However, if the client elects to either create a new request profile or modify the current request profile, the method returns to Step 146 wherein computer generated prompts (i.e. a menu) are provided to the client to determine how the client would like to proceed.

Figures 5, 5A, 5B, 5C:
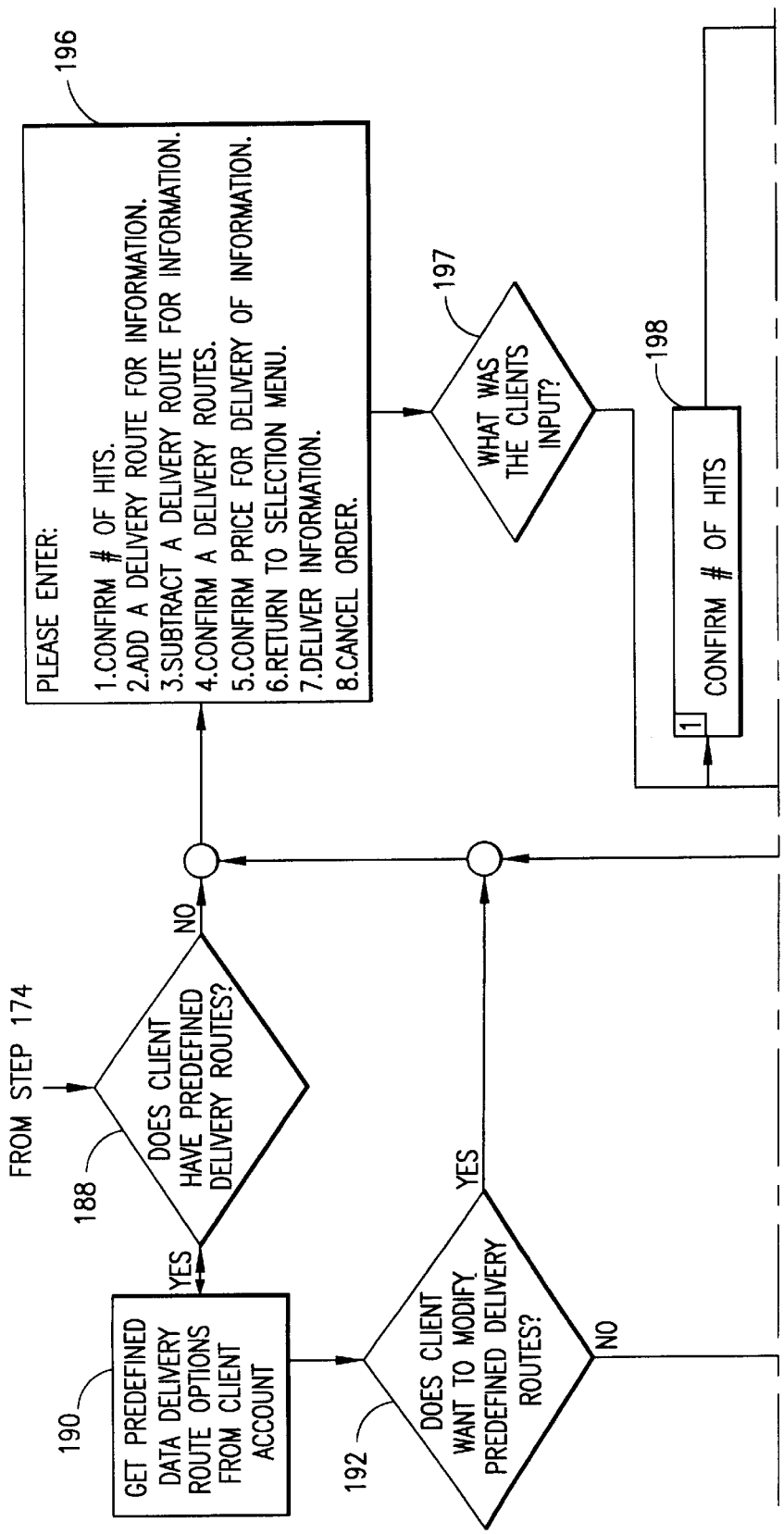
FIG. 5 is a flow chart showing the method of the present invention after the go to delivery routes step (Step 174) of FIG. 4.
Figure 5B:
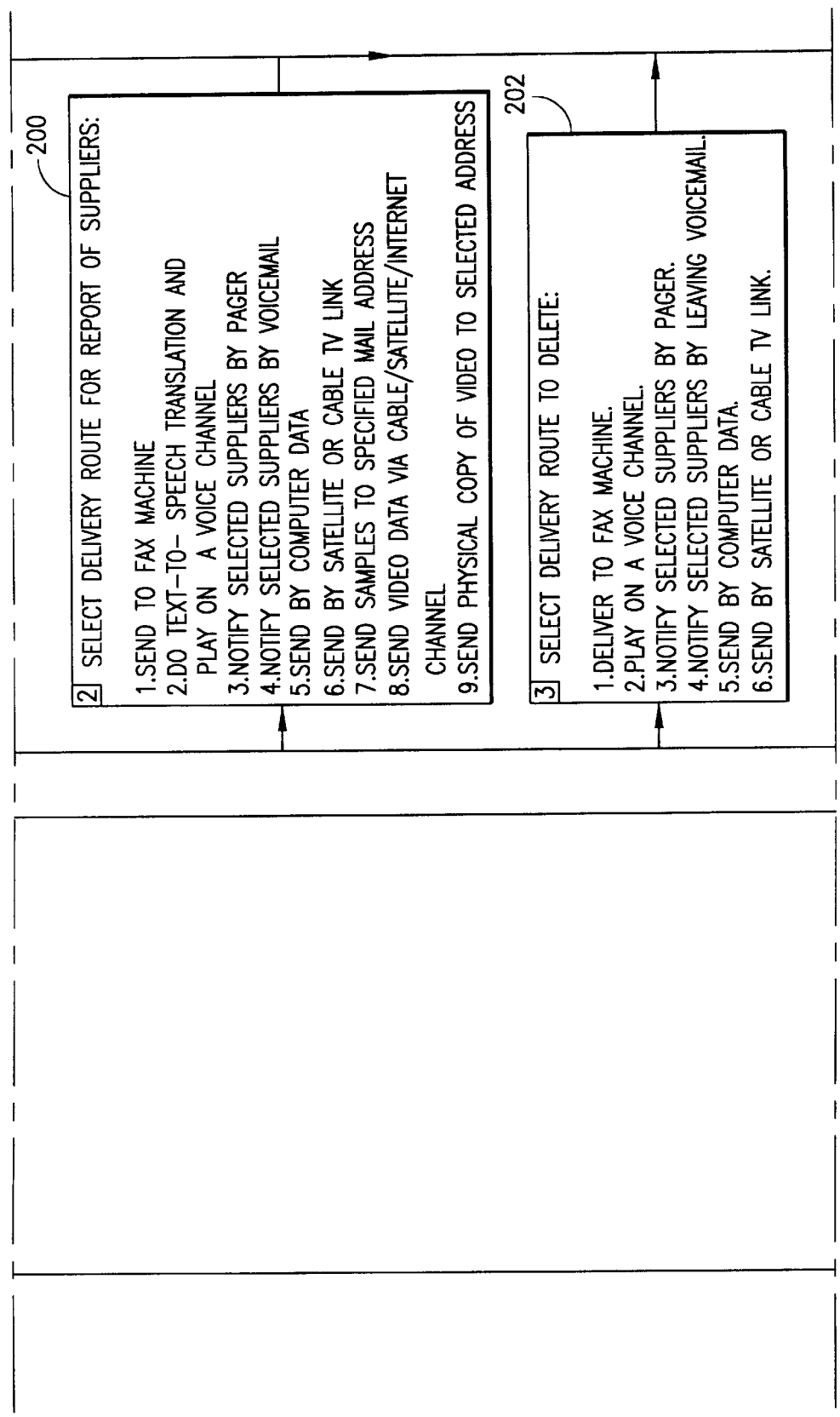
Figure 5C:
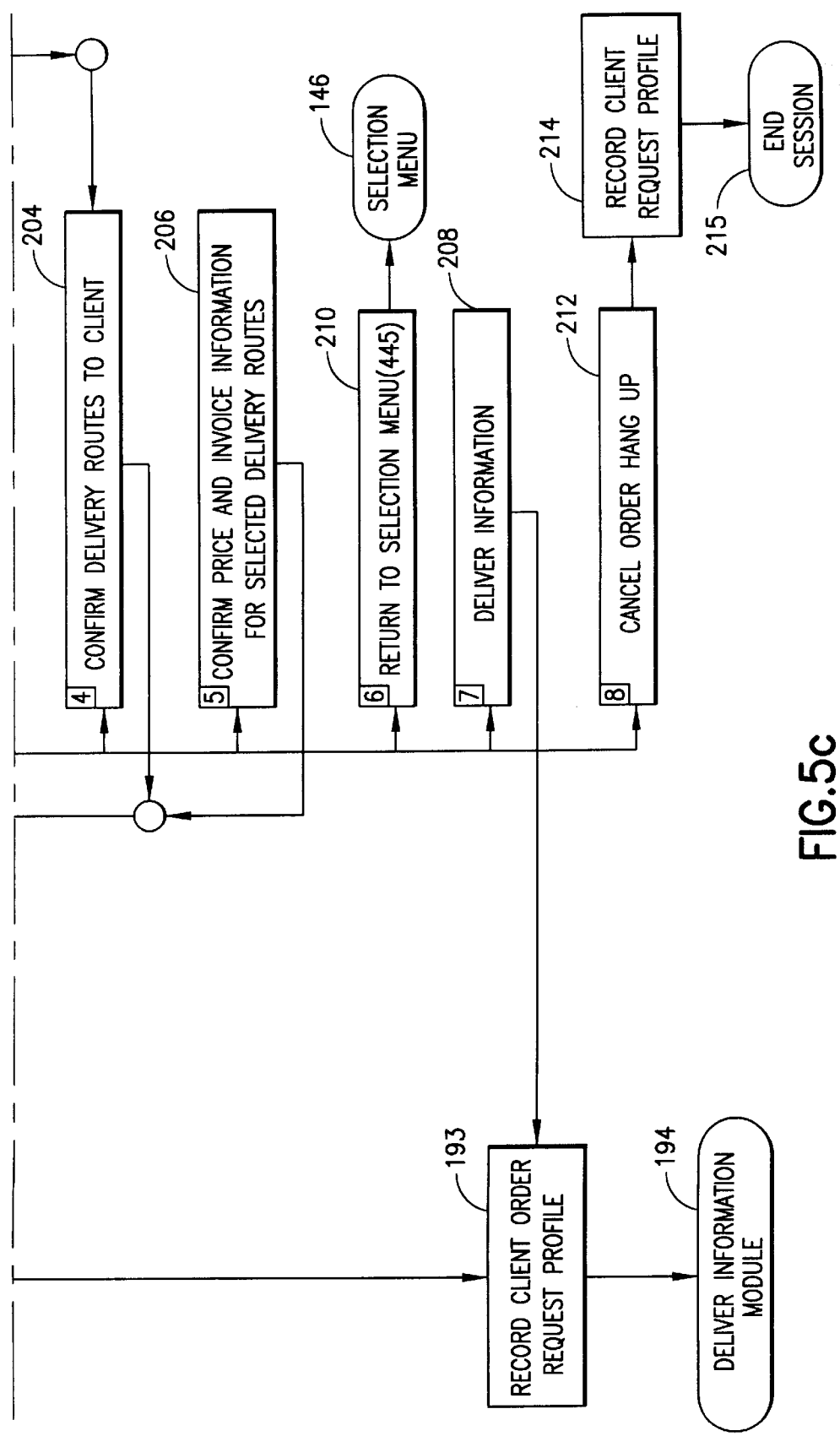

Referring now to FIG. 5, when the client indicates that he would like to have the identity of the matching data items transmitted (Steps 164, 172 and 174 of FIG. 4), the method continues by determining whether the client has predefined delivery instructions stored in the system memory (Step 188). If the client does have predefined delivery instructions which were provided when the client's account was opened (Yes in Step 188), the delivery instructions are retrieved from memory (Step 190). The predefined method of delivery is then provided to the client in order to give the client an opportunity to confirm or modify the predefined delivery instructions (Step 192). If the information client does not wish to modify the method of delivery of information (No in Step 192), then the request profile is recorded (Step 193) and the information is sent to the information client (Step 194) via the predefined delivery instructions in accordance with FIG. 6, described in detailed below.

If the information client elects to modify the predefined delivery instructions (Yes in Step 192), the computer generates prompts (i.e. menu) (Step 196) enabling the client to: 1. confirm a number of matches (hits) within the data base (Step 198); 2. add a delivery route to the delivery instructions (Step 200); 3. subtract a delivery route from the delivery instructions (Step 202); 4. confirm the delivery instructions (Step 204); 5. confirm the price for delivery of the identification of the data item selected from the data base (Step 206); 6. return to the selection menu (Step 146 of FIG. 4) (Step 208); 7. deliver the information relating to the data items (Step 210); and 8. cancel the order (Step 212). In response to an input in Step 196, the system determines the client's selection (Step 197).

If the information client elects to add a delivery route for the data items (selection #2 of Step 196), the client may elect to send the information to a fax machine (selection #1 of Step 200). If this option is selected, the client may be prompted for a country code, area code and telephone number of the facsimile machine to which the information is to be sent. The client may also elect to have text speech translation of the information on a voice channel (selection #2 of Step 200); notify selected suppliers of the client's telephone number by pager (selection #3 of Step 200); client may notify selected suppliers by leaving a voice mail message to selected suppliers (selection #4 of Step 200); send the data items to a computer (selection #5 of Step 200); send the data items by satellite or cable TV link (such as interactive television or cable address) (selection #6 of Step 200); send samples of the data items (raw material) to a specified mailing address (selection #7 of Step 200); send video data via cable/satellite/internet (selection #8 of Step 200); or send a physical copy of a video relating to the raw material to a specific address (selection #9 of Step 200). With each of these options, additional information may be obtained as required by the system by prompting the client for input of the information.

In addition to adding routes to the delivery instructions, routes can be eliminated (selection #3 of Step 196). After the client has added or deleted delivery routes (Steps 200 and 202) and the delivery instructions have been confirmed by the information client (Step 204), and the client elects to have the data items delivered (Step 210), the identity of the data items are then delivered in accordance with the client's specific delivery instructions (Step 194). However, if the client elects to cancel the order (selection #8 of Step 212), the cancelled request profile is recorded in memory (Step 214), and the connection is terminated (Step 215).

Figure 6:
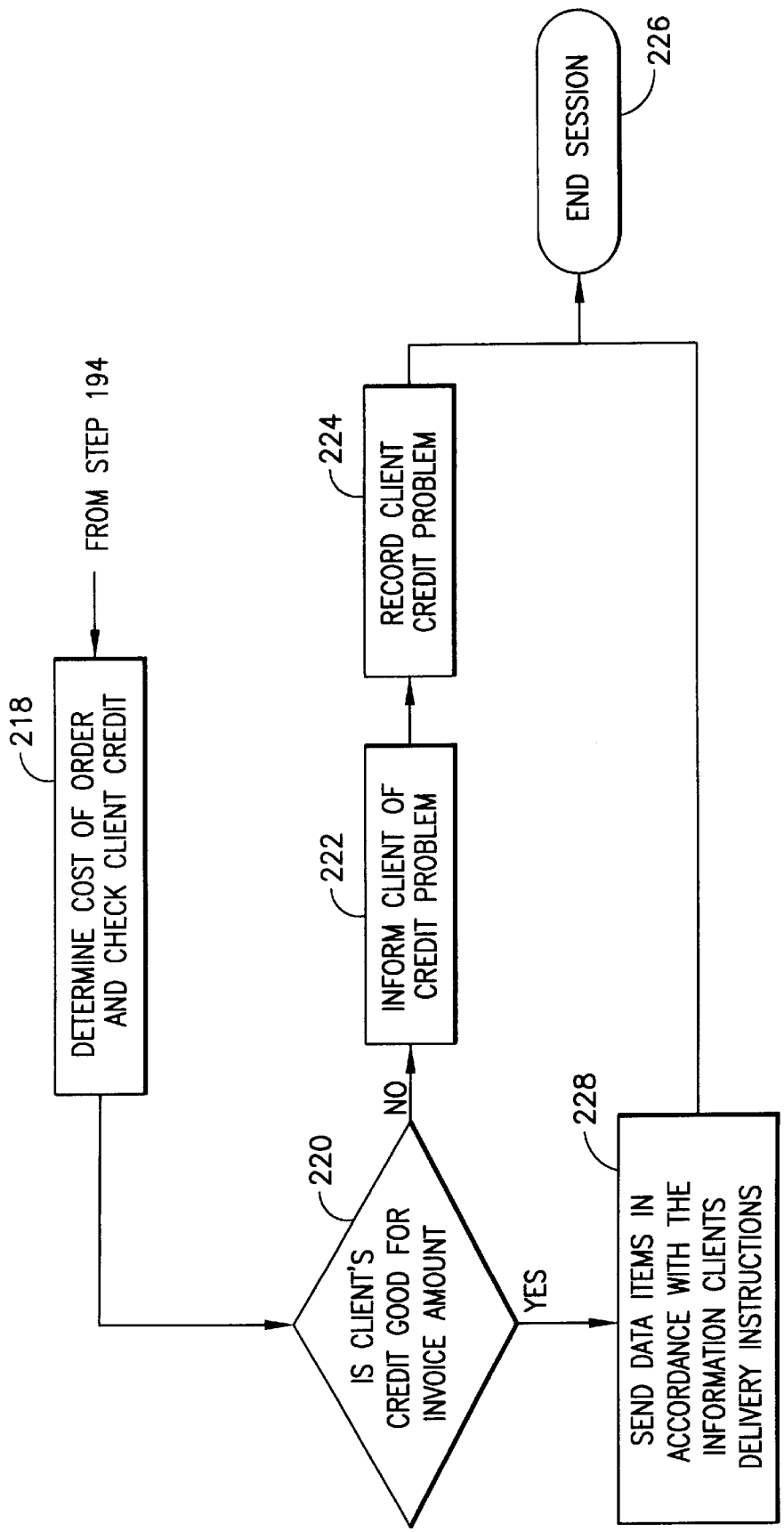
FIG. 6 is a flow chart showing the method of the present invention after the deliver information step (Step 194) of FIG. 5.

Referring now to FIG. 6, the manner of delivery of the information corresponding to the request profile created by the client is shown. First, a determination is made as to the cost for executing the client's order (Step 218) and as to whether the client's credit line (as determined during new client set-up Step 116) is sufficient to cover the cost of executing the order (Step 220). If the client's credit is not sufficient to cover the cost for executing the order (No in Step 220), the client is informed of the credit deficiency by computer voice or customer service representative (Step 222), the client's credit problem is recorded (Step 224) and the session is terminated (Step 226). However, if the client's credit is sufficient to cover the cost for executing the order (Yes in Step 220), then the delivery request of the client is executed in accordance with the client's delivery instructions (e.g. fax, text to speech, page supplier, voice message to supplier, e-mail, send samples, send video data to chosen TV address, or send video hard copy) specified in Step 200 (Step 228). Thereafter, the call is terminated (Step 226) and the system waits for contact by a new user (e.g., supplier or information client).

Once the information is received by the client or a communication is provided to a supplier advising of the data items "match" with the request profile, the client and supplier can contact one another directly to negotiate a final agreement for sale of the raw materials.

As a result of the present invention, the suppliers and purchasers of raw materials sold by volume, weight, box, roll or spool such as textiles and metals can determine the supply and demand for products within a particular industry with relative ease. Therefore, transactions between suppliers and purchasers which might never have occurred because of a lack of knowledge of each others existence, are able to occur.

Although illustrative embodiments for the present invention have been described herein with reference to the accompanying drawings, it is understood that the invention is not limited to those precise embodiments, and that various other changes and modifications may be affected therein by one skilled in the art without departing from the scope or spirit of the invention. For example, the information client, upon learning that a match does not exist for the request profile, may elect to place a listing in the data base wherein suppliers can see that a system subscriber has a desire for a particular product. In addition, it is foreseen that an automatic review can be performed for each supplier once a data item is entered to search the data base for request profiles for which the data base could not provide a match (hit). The supplier could then contact the information client to determine if the client is still interested in purchasing the goods conforming to the request profile. Moreover, it is foreseen that the users (suppliers and information clients) may access the system via a "900" area code number assigned by the telephone company to the system. Therefore, the users would be billed directly by the telephone company thus alleviating the need to determine a user's credit line and, if not sufficient, denying the user access to the system. Another modification occurs to the present invention resides in that the system may confirm the user's input (geometrically descriptive term and trading parameters) after each entry. In this way, the user would immediately know of an entry error once it occurred and would avoid entering an improper data item or the unnecessary cost of conducting a search of the data base for an unintended request profile. It is also foreseen that a user may provide geometrically descriptive terms and trading parameters which are designated as being greater than, equal to or less than specified values. This is accomplished, for example, by combining specifically designated keys on the handset of the touch tone phone, or the computer keyboard as shown in FIG. 7a. In addition, the system may also enable a user to repeatedly copy a previously entered data item or request profile to change selective terms and parameters. For example, if the supplier desires to enter five (5) data items, each having ten (10) terms and parameters, but each differs only in color, the supplier may enter the information of the first data item and copy the first data item for the second through fifth data items, changing only the designation of color. It is also foreseen that statistical information may be provided to both suppliers and information clients. Specifically, the number of requests for a product having a specific request profile or the number of times a request has matched a specific data entry. This information may be beneficial to both suppliers and information clients to determine the demand for a particular product and the supply of goods available to fill the demand. These and all such other modifications are intended to fall within the scope of the present inventions as defined by the following claims.

I claim:

1. A method employing a programmable computer for providing a list of data items corresponding to geometrically describable raw materials based upon a request profile specified by an information client, the method comprising the steps of:

a) storing in a data base, a plurality of data items including a first plurality of geometrically descriptive terms and trading parameters identifying characteristics of an item offered for sale by a supplier;

b) receiving a request profile from an information client, the request profile including a second plurality of geometrically descriptive terms and trading parameters identifying characteristics of an item sought by the information client;

c) comparing the request profile having the second plurality of geometrically descriptive terms and trading parameters with each of the plurality of data items having the first plurality of geometrically descriptive terms and trading parameters;

d) identifying each of the plurality of data items having the first plurality of geometrically descriptive terms and trading parameters which match the second plurality of geometrically descriptive terms and trading parameters of the request profile; and e) providing each of the plurality of data items identified in step d to the information clients;

wherein the first plurality of geometrically descriptive terms and trading parameters for each data item has a first plurality of weight and measure units associated therewith; and wherein the second plurality of geometrically descriptive terms and trading parameters for the profile has a second plurality of weight and measure units associated therewith; and wherein step b further comprises the step of:

normalizing the second plurality of geometrically descriptive terms and trading parameters having the second plurality of weight and measure units associated therewith to correlate with the first plurality of weight and measure units.

2. The method employing a programmable computer for providing a list of data items as defined by claim 1, wherein prior to step e), the method further comprises the steps of:

determining a method of transmission of data items that match the second plurality of geometrically descriptive terms and trading parameters of the request profile.

3. The method employing a programmable computer for providing a list of data items as defined by claim 1, wherein prior to step a), the method further comprises the steps of:

1) receiving a request from a supplier to store a data item in the data base;

2) responsive to prompts provided by the programmable computer, receiving the first plurality of geometrically descriptive terms corresponding to the supplier's data item; and 3) combining the plurality of geometrically descriptive terms provided in step 2) to generate a data item.

4. The method employing a programmable computer for providing a list of data items as defined by claim 3, wherein prior to step 3, the method further comprises:

determining whether the first plurality of geometrically descriptive terms that have been received is sufficient to create a data item.

5. The method employing a programmable computer for providing a list of data items as defined by claim 1, wherein prior to step a, the method further comprises the steps of:

determining whether the supplier is communicating with the programmable computer via one of tone, computer data, voice, fax and video data.

6. The method employing a programmable computer for providing a list of data items as defined by claim 1, wherein step b further comprises the steps of:

providing prompts from the programmable computer for response by the information client to provide the second plurality of geometrically descriptive terms and trading parameters.

7. The method employing a programmable computer for providing a list of data items as defined by claim 1, wherein prior to step (a), the method further comprising the steps of:

responsive to a prompt provided by the programmable computer, receiving a passcode from the supplier and confirming that the received passcode is valid.

8. The method employing a programmable computer for providing a list of data items as defined by claim 7, wherein if the passcode is not valid, setting-up a new account for the supplier.

9. The method employing a programmable computer for providing a list of data items as defined by claim 1, wherein prior to step (b), the method further comprises the steps of:

responsive to a prompt provided by the programmable computer, receiving a passcode from the information client and confirming that the received passcode is valid.

10. The method employing a programmable computer for providing a list of data items as defined by claim 9, wherein if the passcode is not valid, setting up a new account for the information client.

11. The method employing a programmable computer for providing a list of data items as defined by claim 1, wherein step e) further comprises the steps of:

1) obtaining a pre-defined receiving instructions from information client account information; and 2) transmitting the list of data items in accordance with the information client's predefined receiving format.

12. The method employing a programmable computer for providing a list of data items as defined by claim 1, wherein step e) further comprises the steps of:

1) determining how the information client wants the list of data items transmitted; and 2) transmitting the list of data items in accordance with the information client's transmission choice selection.

13. The method employing a programmable computer for providing a list of data items as defined by claim 1, wherein after step e) the method further comprises the steps of:

determining whether the information client has requested transmission of a voice message to a supplier having a data item identified in step d;

if the information client has requested transmission of a voice message, recording a voice message generated by the information client; and transmitting the recorded voice message to a supplier having a data item identified in step d.

14. The method employing a programmable computer for providing a list of data items as defined by claim 1, wherein after step e), the method further comprises the steps of:

determining whether the information client has requested transmission of a facsimile message of the request profile to a supplier having a data item identified in step d; and if the information client has requested transmission of a facsimile message, transmitting the facsimile message of the request profile to a supplier having a data item identified from the list of data items.

15. The method employing a programmable computer for providing a list of data items as defined by claim 1, wherein after step e) the method further comprises the steps of:

determining whether the information client has requested that a supplier having a data item identified in step d) be paged;

if the information client has requested that a supplier be paged, obtaining a telephone number from the information client to be provided to the supplier; and paging the supplier having a data item identified in the list of data items to transmit the telephone number provided by the purchaser.

16. The method employing a programmable computer for providing a list of data items as defined by claim 1 wherein after step e) the method further comprises the steps of:

determining whether the information client has requested transmission of a message regarding the request profile via computer to a supplier having a data item identified in step d, and if the information client has requested transmission of a message regarding the request profile via computer, transmitting the message regarding the request profile via computer to a supplier having a data item identified in the list of data items.

17. Apparatus for providing a list of data items corresponding to geometrically describable raw materials based upon a request profile specified by an information client comprising:

means for storing in a data base, a plurality of data items including a first plurality of geometrically descriptive terms and trading parameters identifying characteristics of an item offered for sale by a supplier;

means for receiving a request profile from an information client, the request profile including a second plurality of geometrically descriptive terms and trading parameters identifying characteristics of an item sought by the information client;

means for comparing the request profile having the second plurality of geometrically descriptive terms and trading parameters with each of the plurality of data items having the first plurality of geometrically descriptive terms and trading parameters;

means for identifying each of the plurality of data items having the first plurality of geometrically descriptive terms and trading parameters which match the second plurality of geometrically descriptive terms and trading parameters of the request profile; and means for providing each of the plurality of data items to the information client;

wherein the first plurality of geometrically descriptive terms and trading parameters for each data item has a first plurality of weight and measure units associated therewith; and wherein the second plurality of geometrically descriptive terms and trading parameters for the profile has a second plurality of weight and measure units associated therewith; the apparatus further comprising:

means for normalizing the second plurality of geometrically descriptive terms and trading parameters having the second plurality of weight and measure units associated therewith to correlate with the first plurality of weight and measure units.

18. Apparatus as defined by claim 17, which further comprises:

means for determining a method of transmission of data items that match the second plurality of geometrically descriptive terms and trading parameters of the request profile.

19. A method employing a programmable computer for providing a list of data items based upon a request profile specified by an information client, the method comprising the steps of:

a) storing in a data base, a plurality of data items including a first plurality of terms and trading parameters identifying characteristics of an item offered for sale by a supplier;

b) receiving a request profile from an information client, the request profile including a second plurality of terms and trading parameters identifying characteristics of an item sought by the information client;

c) comparing the request profile having the second plurality of terms and trading parameters with each of the plurality of data items having the first plurality of terms and trading parameters;

d) identifying each of the plurality of data items having the first plurality of terms and trading parameters which match the second plurality of terms and trading parameters of the request profile; and e) providing each of the plurality of data items identified in step d to the information client;

wherein the first plurality of terms and trading parameters for each data item has a first plurality of units associated therewith; and wherein the second plurality of terms and trading parameters for the profile has a second plurality of units associated therewith; and wherein step b further comprises the steps of:

normalizing the second plurality of terms and trading parameters having the second plurality of units associated therewith to correlate with the first plurality of units.

20. Apparatus for providing a list of data items based upon a request profile specified by an information client comprising:

means for storing in a data base, a plurality of data items including a first plurality of terms and trading parameters identifying characteristics of an item offered for sale by a supplier;

means for receiving a request profile from an information client, the request profile including a second plurality of terms and trading parameters identifying characteristics of an item sought by the information client;

means for comparing the request profile having the second plurality of terms and trading parameters with each of the plurality of data items having the first plurality of terms and trading parameters;

means for identifying each of the plurality of data items having the first plurality of terms and trading parameters which match the second plurality of terms and trading parameters of the request profile; and means for providing each of the plurality of data items to the information client;

wherein the first plurality of terms and trading parameters for each data item has a first plurality of units associated therewith; and wherein the second plurality of terms and trading parameters for the profile has a second plurality of units associated therewith; the apparatus further comprising:

means for normalizing the second plurality of terms and trading parameters having the second plurality of units associated therewith to correlate with the first plurality of units.

21. A method of employing a programmable computer for storing a plurality of data items, each data item including a plurality of terms and trading parameters having a plurality of standard units associated therewith, the plurality of terms and trading parameters and the plurality of standard units identifying characteristics of an item offered for sale by a corresponding supplier, the method comprising the steps of:

receiving a first data item corresponding to an object being offered for sale by a supplier, the first data item including a plurality of first terms and trading parameters and a plurality of first units associated therewith;

determining a relationship between the plurality of first units and the plurality of standard units; and normalizing the plurality of first terms and trading parameters having the plurality of first units to a plurality of converted terms and trading parameters associated with the plurality standard units; and storing data items corresponding to at least one of the plurality of first terms and trading parameters and the relationship between the first plurality of units and the plurality of standard units, and the converted plurality of first terms and trading parameters in the programmable computer;

wherein the programmable computer receives a request profile specified by an information client, the programmable computer correlates the request profile to the stored data items, and advises the information client as to which stored data items most closely match the request profile.

* * * * *